Oct. 12, 1948.  R. R. LA MOTTE  2,451,099
METHOD OF UNITING METAL PIECES BY MEANS OF
A BONDING LAYER OF PREDETERMINED THICKNESS
Filed Aug. 28, 1945

INVENTOR
Ralph R. La Motte
BY
his ATTORNEYS

Patented Oct. 12, 1948

2,451,099

UNITED STATES PATENT OFFICE 2,451,099

METHOD OF UNITING METAL PIECES BY MEANS OF A BONDING LAYER OF PREDETERMINED THICKNESS

Ralph R. La Motte, Dayton, Ohio, assignor to General Motors Corporation, Detroit, Mich., a corporation of Delaware Application August 28, 1945, Serial No. 613,162

4 Claims. (Cl. 113—112)

This invention relates to a method of uniting, by a layer of bonding metal, pieces of ferrous metal such as the steel parts of hollow blade propellers. It has been found that the blade will have the maximum fatigue strength if the thickness of the bonding layer is not less than .005 inch and not greater than .007 inch.

It is an object of the present invention to provide a method of uniting ferrous metal pieces by a layer of bonding metal of substantially uniform thickness of such dimension as to obtain satisfactory fatigue strength.

According to the disclosed embodiment of the present invention, the method consists of cleaning and fluxing the contiguous surfaces of the bodies to be jointed, placing between the surfaces, metal spacing balls and a bonding material having a melting point substantially below the melting points of the bodies and the balls, applying to the body external pressure sufficient to maintain the contiguous surfaces of the bodies in contact with the balls but less than required to deform the balls or to cause them to deform the contiguous surfaces of the body, heating the assembly of the bodies, balls and bonding material in a non-oxidizing atmosphere, while said pressure is maintained, to a temperature sufficient to melt the bonding material but substantially below the melting points of the bodies and the balls, and cooling the assembly while the pressure is maintained, whereby there is provided a substantially continuous bonding layer of substantially uniform thickness of a dimension such as to give satisfactory fatigue strength.

Further objects and advantages of the present invention will be apparent from the following description, reference being had to the accompanying drawings, wherein a preferred embodiment of the present invention is clearly shown.

Figure 1:
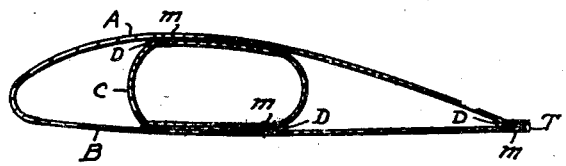
Figs. 1 and 2 are sectional views of propeller blades of different constructions to which the present invention may be applied.
Figure 2:
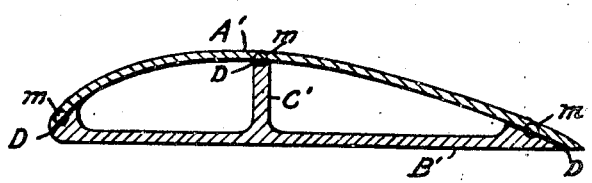

Referring to Fig. 1, the blade comprises a sheet metal member folded and shaped to provide the airfoil parts A and B and bonded at the trailing edge T and bonded to a tubular midrib C extending from a blade root not shown. Fig. 2 shows a blade comprising a sheet steel part A' bonded to a steel forging B' which is integral with a mid-rib C' and with a blade root not shown.

Figure 3:
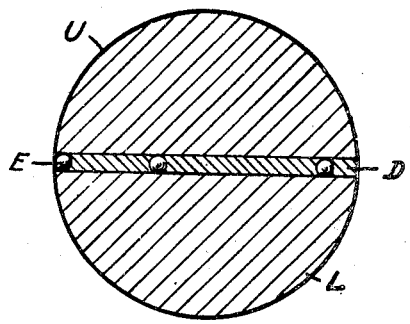
Fig. 3 is a magnification of portions of Figs. 1 and 2 enclosed between small circles $m$.

Fig. 3, which is a microscopic view of the portions of Figs. 1 and 2 enclosed in the small circle $m$, shows a layer of bonding metal D between the bodies to be united. The final thickness of the bonding layer D is determined by a plurality of metal balls E.

The contiguous surfaces of the parts to be bonded (designated U and L in Fig. 3) are thoroughly cleaned to remove dirt, grease, oxide and other material which would interfere with the union between the ferrous metal and the bonding layer. The surfaces are coated preferably with a paste-like flux. While the lower body L, for example, is located horizontally, a number of metal balls are sprinkled sparingly upon its pasted upper surface, the quantity being sufficient for limiting the spacing of the upper part U from the lower part L. An excessive number of balls would tend to weaken the bond. Since the bond layer thickness should be confined between .005 to .007 of an inch, the diameter of the balls may be .006 of an inch for example. These balls should be uniform in diameter and should be made of a metal having a relatively high melting point comparable to the melting point of steel. Balls of steel or malleable iron have given satisfactory results, but nickel balls are preferred.

The bonding material is next placed upon the paste layer upon which the balls have been sprinkled. The bond metal may be in powder form or may be a metal foil having a thickness slightly in excess of the required thickness of the binding layer, for example, the thickness should be about .0065 of an inch to give a final bond-layer thickness of .006 of an inch. If greater shear strength is required, the bond material may be a foil of copper sandwiched between two foils of silver, the thickness of the foils being such as to give the .006 inch bond-layer thickness.

External pressure is applied to the bodies in order to hold them is assembled relation as shown in the drawings, the pressure being such as to maintain the contiguous surfaces of the bodies in contact with the balls but less than required to deform the balls or to cause them to deform the contiguous surfaces of the bodies. While this pressure is maintained, the assembly is heated in a non-oxidizing atmosphere to a temperature sufficient to melt the bonding material but substantially below the melting points of the bodies and the balls. While the bonding metal is molten, the space between the bodies is filled with the bonding metal except as to the spaces occupied by the balls. Any slight excess in bonding material will, of course, escape at the edges of the bodies. During cooling of the assembly, the pressure is maintained, thereby resulting in a layer of bonding metal of substantially uniform thickness and having such thickness that the fatigue strength of the bond is satisfactory.

While the embodiment of the present invention as herein disclosed, constitutes a preferred form, it is to be understood that other forms might be adopted, all coming within the scope of the claims which follow.

What is claimed is as follows:

1. The method of bonding bodies of ferrous metal which comprises cleansing and fluxing the contiguous surfaces of the bodies, placing between the surfaces metal spacing balls sufficient in quantity to obtain the required spacing, placing between the surfaces a bonding metal sufficient when melted to fill the remaining space between said contiguous surfaces, and having a melting point substantially below the melting points of the bodies and balls, applying to the bodies external pressure sufficient to maintain the contiguous surfaces of the bodies in contact with the balls but less than required to deform the balls or to cause them to deform the contiguous surfaces of the bodies, said balls being substantially uniform in diameter and of such dimension as to limit the thickness of the bonding layer to that which will give satisfactory fatigue strength, and, while said pressure is maintained, heating the assembly of bodies, bolls and bonding material in a non-oxidizing atmosphere to a temperature sufficient to melt the bonding metal but substantially below the melting points of the bodies and the balls, and cooling the assembly while said pressure is maintained, whereby there is provided a substantially contiguous bonding layer of substantially uniform thickness of a dimension such as to give satisfactory fatigue strength.

2. In the manufacture of structures formed from ferrous members overlapped at contiguous surfaces for juncture, by bonding, the method of insuring bond layers of predetermined thickness including, cleaning and fluxing the contiguous surfaces of the component parts to be joined, interposing a sprinkling of individual spacer bodies of substantially uniform thickness, and of a magnitude to determine the predetermined thickness of bond over the fluxed area, and an excess of bonding material to fill the remaining space when melted situate between the contiguous surfaces, clamping the members, spacer bodies and bonding material together while heating the assembly through the bonding cycle to fuse the bond material with the contiguous surfaces and around the spacer bodies, and cooling the bonded members while under clamped relation.

3. A process for the manufacture of propeller blades from metal components having overlapped portions, cleaned, fluxed and preparatory for bonding, which consists in distributing in widely spaced relation over one of the contiguous surfaces to be bonded substantially spherical spacer bodies that are of a hardness not to be softened by bonding temperatures, interposing a layer of bonding metal sufficient when melted to fill the space between the contiguous surfaces, pressing the overlapped portions of the metal components with the interposed bonding metal and spacers with such force while heating to force the overlapping portions into contact with the spacers for defining the thickness of the bond layer as it melts during the heating, and cooling the clamped bodies while the bond layer solidifies to secure the component members.

4. The process of bonding together two metallic members which consists in forming on each a surface contiguous with the other, cleaning and fluxing the contiguous surfaces, interposing between the contiguous surfaces individual spacer bodies of uniform predetermined magnitude for maintaining the surfaces equally separated during the bonding cycle, applying a sufficient amount of bond metal to surround all of the spacers and fill the remaining space between the contiguous surfaces, then clamping while heating for the bonding cycle, during which the bond metal is liquified and the component members are secured together.

RALPH R. LA MOTTE.

REFERENCES CITED

The following references are of record in the file of this patent:

UNITED STATES PATENTS

| Number | Name | Date |
|---|---|---|
| 1,956,233 | Braun | Apr. 24, 1934 |
| 2,337,322 | Gascoigne | Dec. 21, 1943 |